United States Patent [19]
Liao

[11] Patent Number: 6,058,987
[45] Date of Patent: May 9, 2000

[54] PORTABLE WOOD PLANING MACHINE WITH MECHANISMS FOR LOCKING AND ADJUSTING A CARRIAGE

[76] Inventor: Juei-Seng Liao, No. 295, Sec. 1, Nanking East Rd., Taichung City, Taiwan

[21] Appl. No.: 09/249,877

[22] Filed: Feb. 16, 1999

[51] Int. Cl.[7] .................................................. B27C 1/14
[52] U.S. Cl. .................................... 144/130; 144/117.1
[58] Field of Search ......................... 144/114.1, 117.1, 144/129, 130, 373; 403/109.1, 330, 374.5, 377

[56] References Cited

U.S. PATENT DOCUMENTS

| | | | |
|---|---|---|---|
| 4,456,042 | 6/1984 | Clark et al. | 144/129 |
| 5,771,949 | 6/1998 | Welsh et al. | 144/130 |
| 5,794,675 | 8/1998 | Garcia | 144/130 |
| 5,816,303 | 10/1998 | Shadeck | 144/130 |
| 5,829,499 | 11/1998 | Liao | 144/130 |
| 5,927,357 | 7/1999 | Welsh et al. | 144/130 |
| 5,957,173 | 9/1999 | Garcia | 144/130 |

*Primary Examiner*—W. Donald Bray
*Attorney, Agent, or Firm*—Christie, Parker & Hale, LLP

[57] ABSTRACT

A wood planing machine includes a base, two pairs of posts extending upward from the base, an upper carriage mounted movably on the posts, and a pair of screw rods each of which extends from the base through the upper carriage between each pair of posts. The upper carriage has two pairs of sockets disposed around the posts. Each socket has a tubular socket wall surrounding the corresponding post, and a window opening formed in the tubular socket wall. A rotating rod is mounted on the upper carriage and extends transversely between the screw rods. A worm drive mechanism is connected to the rotating rod, the screw rods and the upper carriage so that the upper carriage moves along the screw rods and the posts when the rotating rod is rotated. A tube is disposed around the rotating rod, and two pairs of arms are mounted movably on the tube with the ends thereof extending to the posts, respectively. Two pairs of clamp plates are movably held by the arms and are movably received in the window openings of the tubular socket walls. The clamp plates are moved by the arms to a clamping position, wherein each of the clamp plates abuts against a corresponding one of the posts.

16 Claims, 11 Drawing Sheets

PORTABLE WOOD PLANING MACHINE WITH MECHANISMS FOR LOCKING AND ADJUSTING A CARRIAGE

BACKGROUND OF THE INVENTION

1. Field of the Invention

The invention relates to a wood planing machine, more particularly to a portable wood planing machine having a locking mechanism for locking a carriage and an adjustment mechanism for adjusting the height of the carriage from a base.

2. Description of the Related Art

Figure 1:
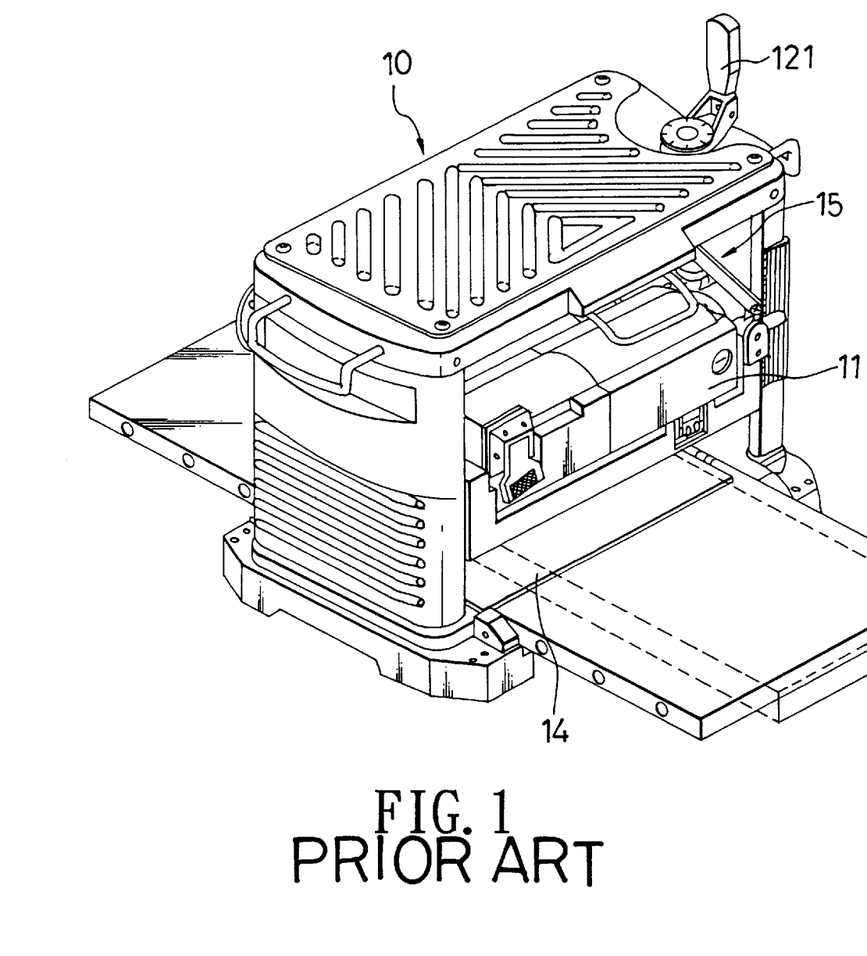
FIG. 1 shows a portable wood planing machine known in the art.

Various forms of wood planing machines have existed in the art. FIG. 1 shows a portable planing machine 10 which is disclosed in U.S. Pat. No. 5,771,949. The planing machine 10 has an upper carriage 11 which is mounted on a lower base 14 via two pairs of upstanding posts (not shown) provided at two sides of the base 14 and which is slidable along the posts to move upward and downward. The carriage 11 carries a workpiece planing element, and the base 14 serves to support a workpiece to be formed or planed by the workpiece planing or forming element. At each side of the base 14 is provided an upstanding screw rod (not shown) between each pair of the upstanding posts. The screw rods at two sides of the base 14 pass through the carriage 11 and can be turned by operating an operating lever 121. When the screw rods are turned, the carriage 11 is moved upward or downward, thus adjusting a gap between the carriage 11 and the base 14, which determines the thickness of the workpiece formed by the machine 10. A locking mechanism for locking the carriage against movement relative to the upstanding posts of the base 14 includes two pairs of linkage assemblies 15 each of which is disposed between two adjacent upstanding posts at one side of the carriage 11. Each linkage assembly has a pair of pivotally interconnected linkage members and two clamp members attached to the linkage members. When the linkage assembly is in a stretched position, the clamp members are moved outward so that they abut against the upstanding posts and push the same to the corresponding bearing members (not shown), thus clamping the upstanding posts against the bearing members. Such linkage assembles are found to be disadvantageous in that, when the planing machine vibrates during operation, the pivotally interconnected linkage members may accidentally collapse and move the clamp members away from their clamping positions. On the other hand, as the upstanding posts hold the carriage 11 by passing through socket members integrally formed with the carriage, the walls of the socket members are subjected to clamping forces which are applied to the upstanding posts. These clamping forces are applied in directions from an inner side of the carriage 11 to an outer side thereof. Since the socket members and outer structural members of the carriage 11 generally have less thickness and strength as compared to those situated at the inner side of the carriage 11, the carriage 11 tends to wear and break at the outer sides thereof due to the frequently applied outward clamping forces.

The planing machine 10 further has an adjustment mechanism for adjusting the gap between the carriage 11 and the base 14. The adjustment mechanism comprises a rotary adjustment member which is mounted on the base and which is selectively movable among a plurality of operating positions. The rotary adjustment member has a plurality of screw members arranged annularly at intervals and projecting upward to different heights. When the carriage 11 moves downward and contacts one of the screw members, the carriage 11 is stopped at the height of the screw member contacted therewith. A drawback in this adjustment mechanism is that the number of the annularly arranged screw members is limited by the diameter of the rotary adjustment member which is disposed in a limited space of the planing machine.

SUMMARY OF THE INVENTION

An object of the present invention is to provide a portable planing machine with improved locking and adjusting mechanisms that can overcome the above-described disadvantages.

According to the present invention, a planing machine comprises: a base having two opposing sides, and two pairs of upstanding posts extending upward from the base at the sides, respectively; an upper carriage having two opposing sides, and two pairs of sockets disposed at the sides of the upper carriage respectively, the upper carriage being mounted movably on the posts, the posts passing through the sockets, the sockets having tubular socket walls surrounding the posts, respectively, each of the tubular socket walls having a window opening; a pair of screw rods, each of the screw rods extending upward from one of the sides of the base between one of the pairs of the posts, the screw rods passing through the upper carriage; moving means for moving upward and downward the upper carriage along the posts and for adjusting a gap between the upper carriage and the base, the moving means having a rotating rod mounted on the upper carriage and extending transversely between the screw rods, and a worm drive mechanism connected to the rotating rod, the screw rods and the upper carriage to move the upper carriage when the rotating rod is rotated; locking means for locking the upper carriage relative to the posts, the locking means comprising a tube which is disposed around the rotating rod and which has two ends adjacent the screw rods, respectively, two pairs of arms mounted on the two ends of the tube and extending to the sockets, respectively, and two pairs of clamp plates held by the arms, the clamp plates being movably received in the window openings of the tubular socket walls and moved by said arms to a clamping position wherein each of the clamp plates abuts against the corresponding one of the posts.

The planing machine further comprises adjusting means for adjusting the height of the upper carriage from the base. The adjusting means includes a longitudinal slide member mounted on the base for moving in a direction transverse to the posts, the slide member having a stepped top face with a plurality of steps of different heights arranged in a longitudinal row. The adjusting means further includes a regulating member projecting downward from the upper carriage above the stepped top face to contact selectively the steps so as to stop lowering of the upper carriage at one of the heights of the steps.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
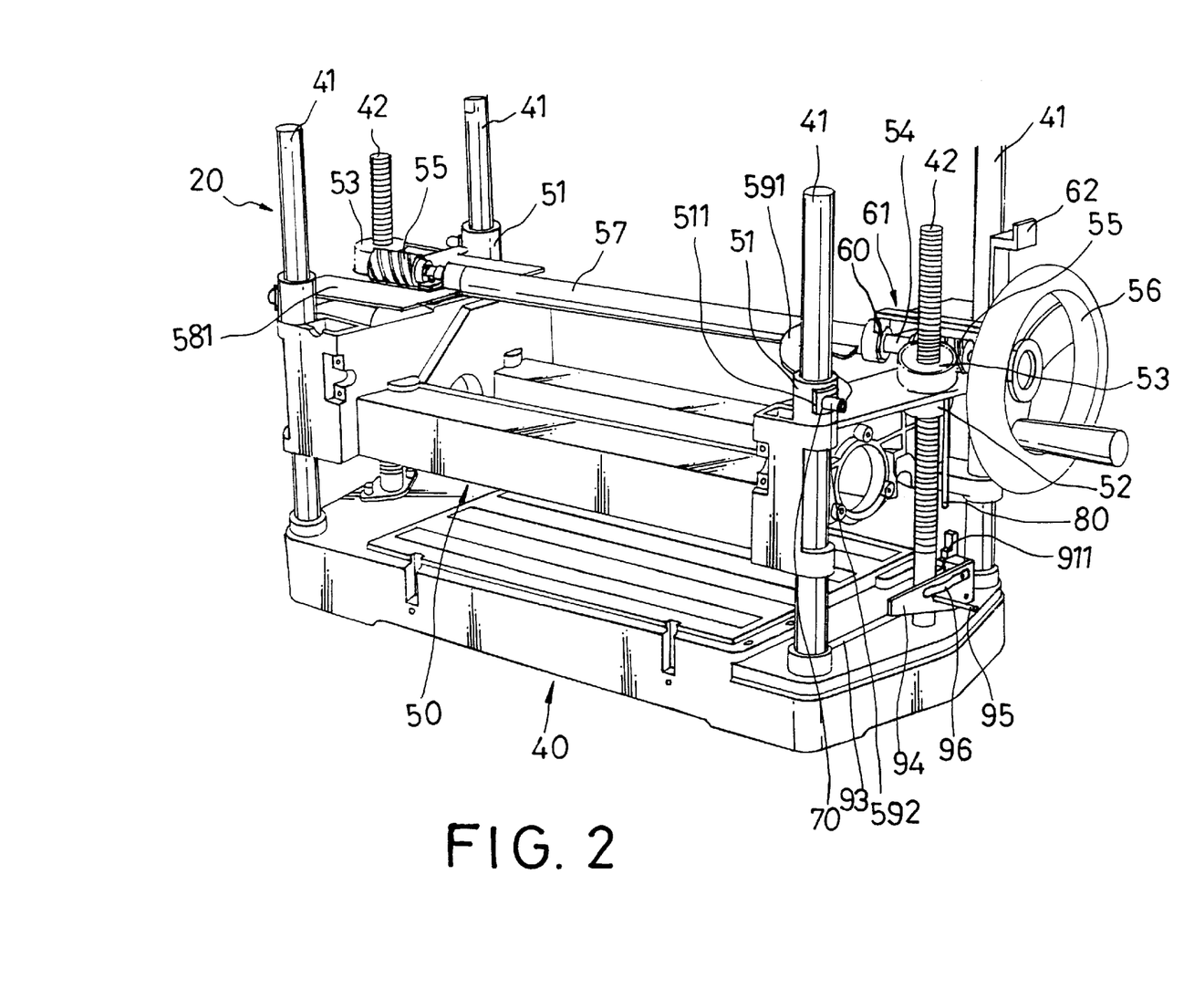
FIG. 2 is a perspective view of a wood planing machine incorporating the present invention with a housing thereof removed for the sake of clarity.
Figure 3:
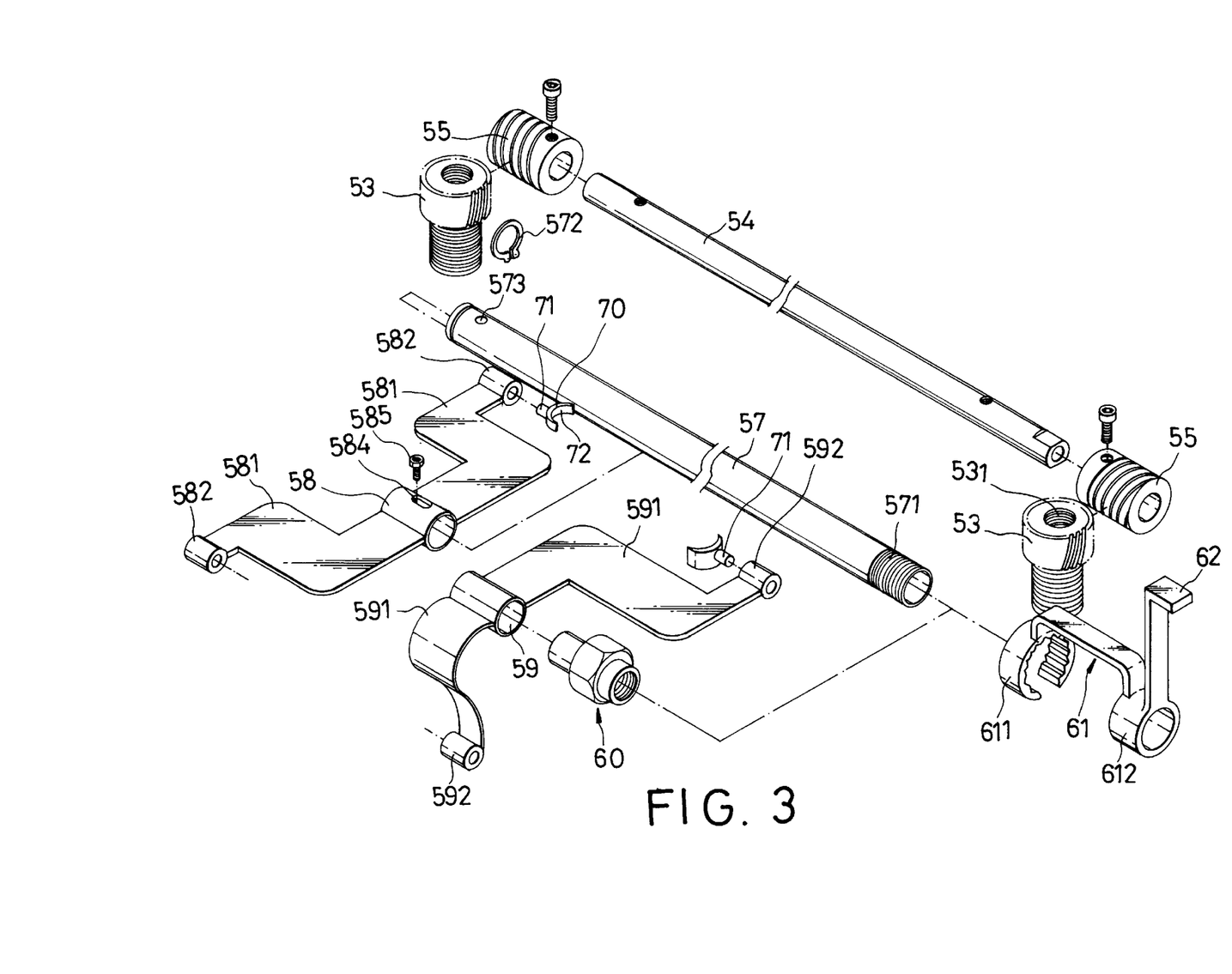
FIG. 3 is a fragmentary exploded view which shows the locking means of the wood planing machine of FIG. 2.
Figure 4:
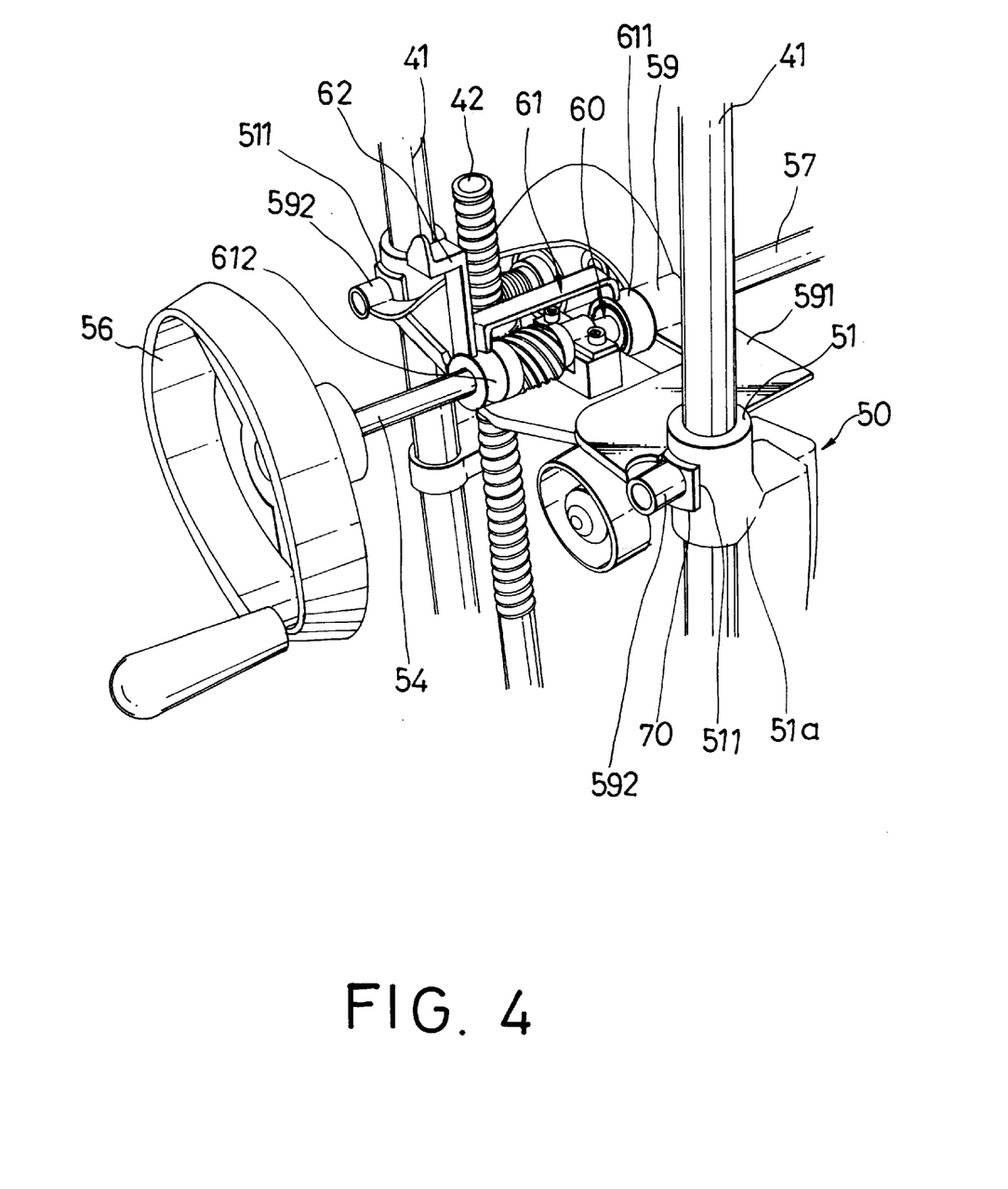
FIG. 4 is a fragmentary perspective view showing a portion of the locking means of FIG. 2.

Referring to FIGS. 2, 3 and 4, a wood planing machine 20 which incorporates the present invention is shown to include a base 40 for supporting a wooden workpiece and a carriage 50 which carries a workpiece planing element (not shown). A housing which covers the base 40 and the carriage 50 is not shown in these figures. The base 40 has two pairs of upstanding posts 41 extending from two sides of the base 40. The upper carriage 50 has four mounting sockets 51 and is mounted on the posts 41 in a movable position. The posts 41 respectively pass through the mounting sockets 51. The base 40 further has a pair of screw rods 42, each of which is disposed between two adjacent posts 41 at one side of the base 40. Each screw rod 42 extends upward and passes through a hole 52 of the upper carriage 50.

Moving means for moving the upper carriage 50 along the posts 41 includes two worm gears 53 which are mounted on the upper carriage 50 by disposing the same in the holes 52. Each worm gear 53 has an internal thread 531 to engage the corresponding screw rod 42. A rotating rod 54 is mounted on the upper carriage 50 in a bridging manner between the screw rods 42 and has two ends provided with worms 55 to engage the worm gears 53, respectively. A handle wheel 56 is connected to one end of the rotating rod 54.

When the handle wheel 56 is turned, the worms 55 drive the worm gears 53, respectively, thus moving the upper carriage 50 upward or downward and adjusting the gap between the upper carriage 50 and the base 40.

Locking means for locking the upper carriage 50 relative to the posts 41 includes a tube 57 which is provided around the rotating rod 54 and which has one end formed with an external thread 571. There are two mounting sleeves 58 and 59 disposed adjacent to two ends of the tube 57. The mounting sleeves 58, 59 respectively hold two pairs of arms 581, 591 which extend to the corresponding posts 41. The mounting sleeve 58 is sleeved onto one end of the tube 57 and is retained thereat via a C-shaped ring 572 that is disposed around the tube 57 outwardly of the mounting sleeve 58. An elongated hole 584 is provided in the mounting sleeve 58 in alignment with a screw hole 573 of the tube 57, and a screw 585 passes through the elongated hole 584 and fitted in the screw hole 573, thereby preventing the tube 57 from rotating relative to the mounting sleeve 58 and limiting longitudinal movement of the mounting sleeve 58 relative to the tube 57.

The mounting sleeve 59 is sleeved movably onto the other end of the tube 57 adjacent to the external thread 571. The external thread 571 engages threadedly a nut 60. A wrench 61 has a clamp part 611 to engage the nut 60 and a mounting part 612 sleeved onto the rotating rod 54 adjacent to and inwardly of the handle wheel 56. An integral handle 62 extends radially from the mounting part 612.

The arms 581, 591 are formed with hollow seats 582, 592 at the ends thereof to respectively hold clamp plates 70. Each clamp plate 70 is curved and has a stem 71 projecting in a direction opposite to a curved clamping face 72 of the clamp plate 70. The stem 71 of each clamp plate 70 is fitted in the corresponding hollow seat 582 or 592. The clamp plates 70 are held by the arms 581, 591 in such a manner that the clamp plates 70 are located outwardly of the corresponding posts 41 and adjacent to the corresponding sockets 51. The clamp plates 70 are movable between a clamping position and a non-clamping position.

Each socket 51 has a tubular socket wall 51a surrounding the corresponding post 41. Each tubular socket wall 51a has a window opening 511 opposite to the corresponding clamp plate 70 to expose an outer side of the corresponding post 41 as best shown in FIG. 4. Each clamp plate 70 is received movably and complementarily in the corresponding window opening 511 for engaging the exposed outer side of the corresponding post 41 in the clamping position of the clamp plate 70. The curved clamping face 72 has the same curvature as the corresponding tubular socket wall 51a.

Figure 5:
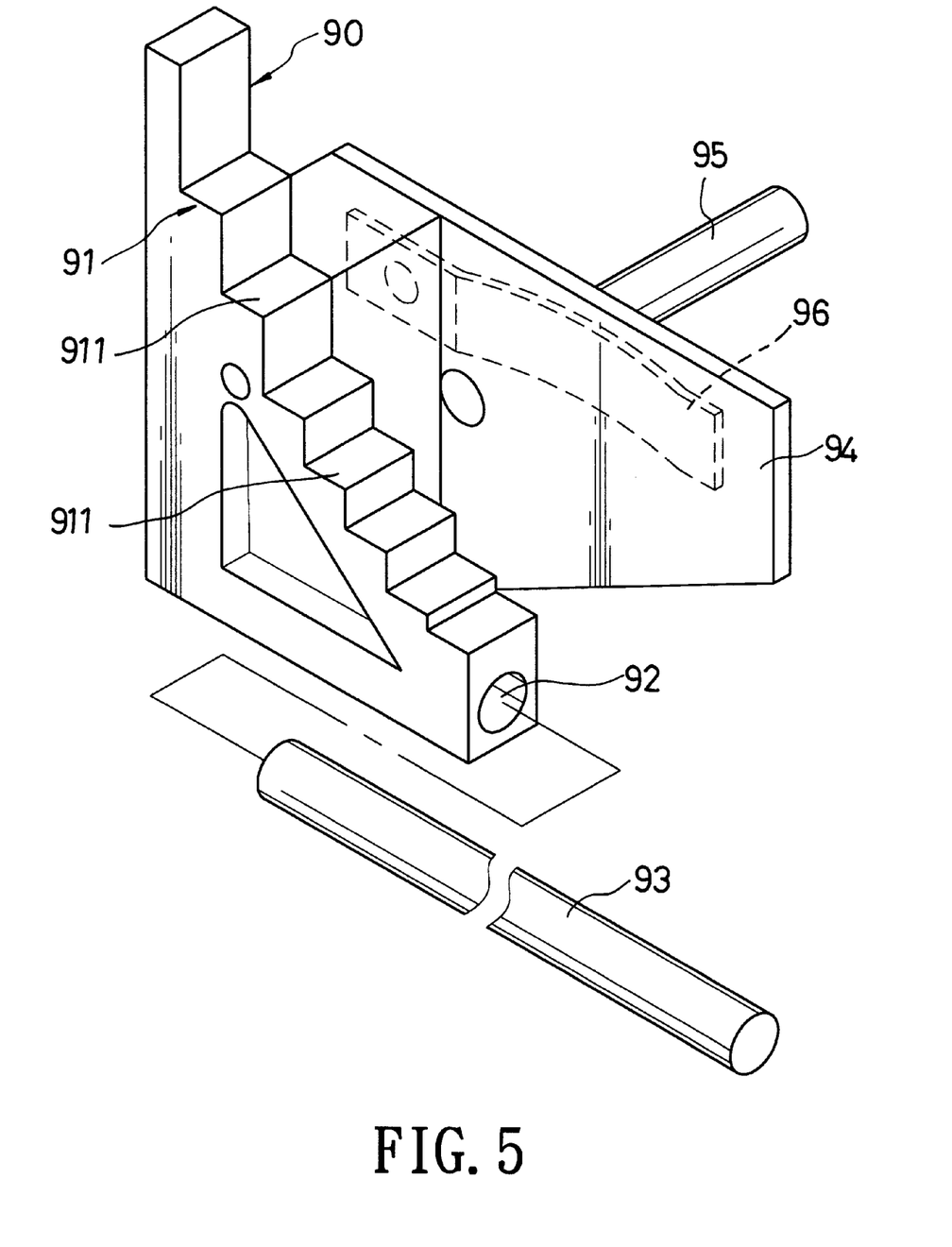
FIG. 5 is a fragmentary exploded view showing the adjusting means shown in FIG. 2.
Figure 6:
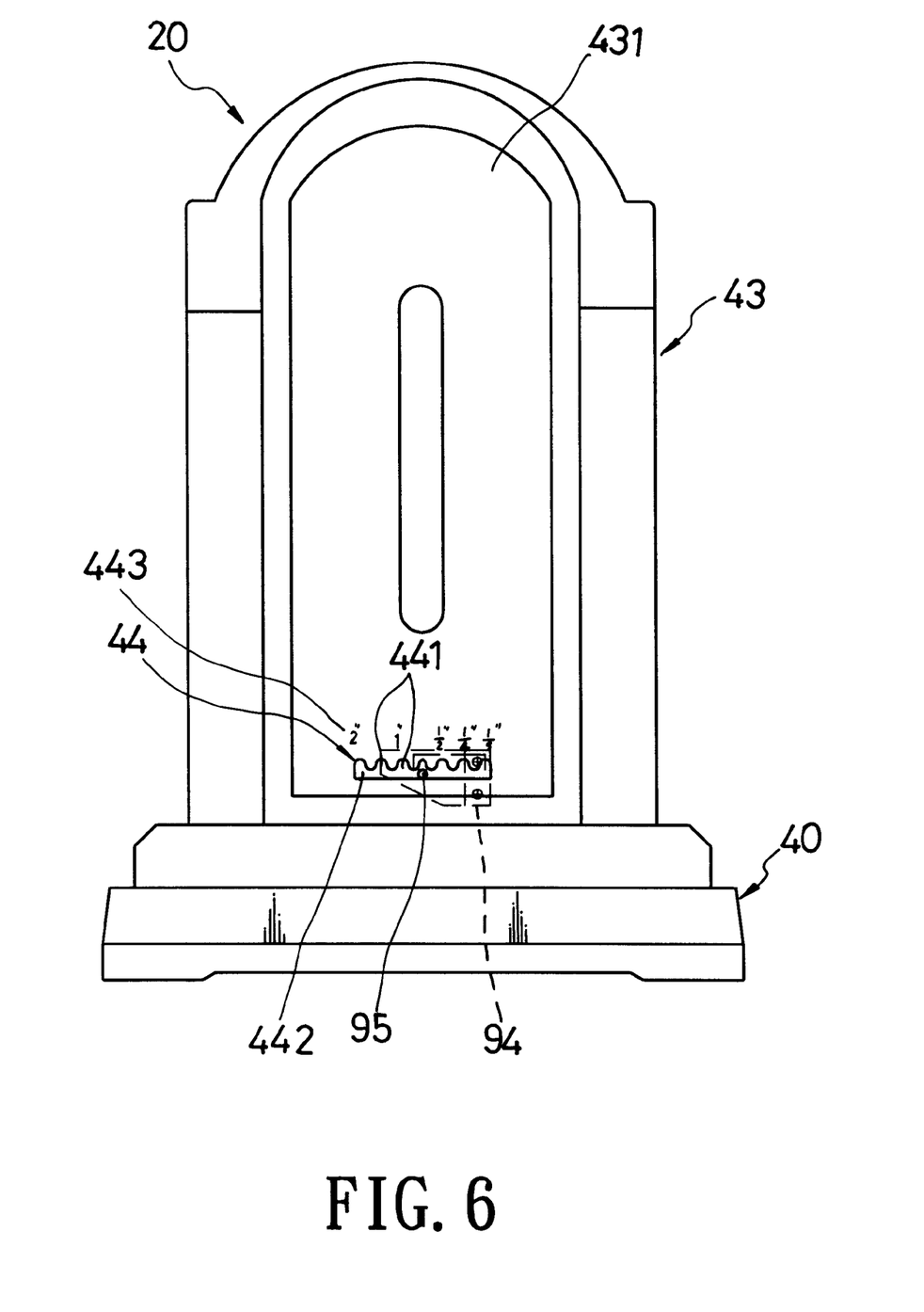
FIG. 6 is a side elevation view of the planing machine of FIG. 2 but with the housing thereof attached.

Referring to FIGS. 5 and 6 in combination with FIG. 2, adjusting means for adjusting the height of the upper carriage 50 relative the base 40 includes a regulating rod 80 which projects downward from one side of the upper carriage 50. A longitudinal slide member 90 is mounted on the base 40 below the regulating rod 80 and between two posts 41 at one side of the base 40 adjacent to a side cover 431 of a housing 43 of the planing machine 20. The slide member 90 has a stepped top face 91 with a plurality of steps 911 at varying heights arranged in a longitudinal row. The height of the stepped top face 91 increases from the bottom to the top of the slide member 90. A longitudinal slide groove 92 is provided in the bottom of the slide member 90. A rail member 93 passes through the slide groove 92 and has two ends fixedly mounted on the base 40 between the two posts 41. A resilient arm member 94 is connected integrally to the slide member 90 and is disposed in parallel and adjacent to the side cover 431. A restraining spring plate 96 is attached to the resilient arm member 94 and abuts resiliently against the side cover 431 so as to resiliently limit movement of the slide member 90 relative to the side cover 431. An operating member or rod 95 is connected to the resilient arm member 94 and extends outwardly of the side cover 431 through a passage 44 formed in the side cover 431. A plurality of engaging slots 441 for engaging and positioning the operating rod 95 are formed in the passage 44 in communication with a slide slot 442 through which the operating rod 95 can slide and change its position. As the operating rod 95 is attached to the resilient arm member 94, the operating rod 95 can be moved from the engaging slots 441 to the slide slot 442 by pressing downward the operating rod 95. The number of the engaging slots 441 conforms to the number of the steps 911 of the slide member 90. Graduation marks 443 are provided on the side cover 431 adjacent to the engaging slots 441. The graduation marks 443 indicate the thickness of the workpiece that will be formed by the planing machine 20.

Figure 7:
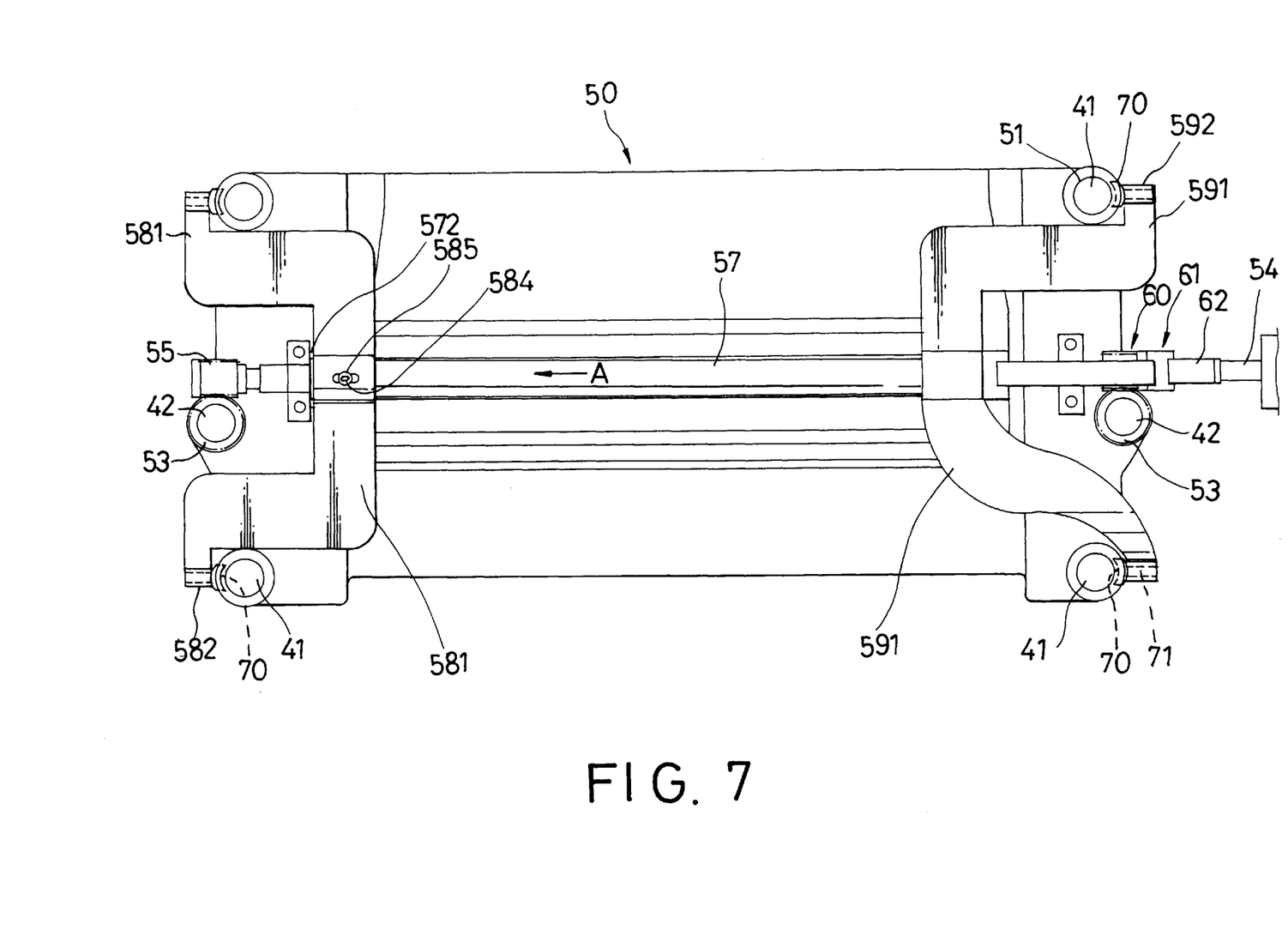
FIG. 7 is a schematic plan view of the locking means with clamp plates in non-clamping positions.
Figure 7A:
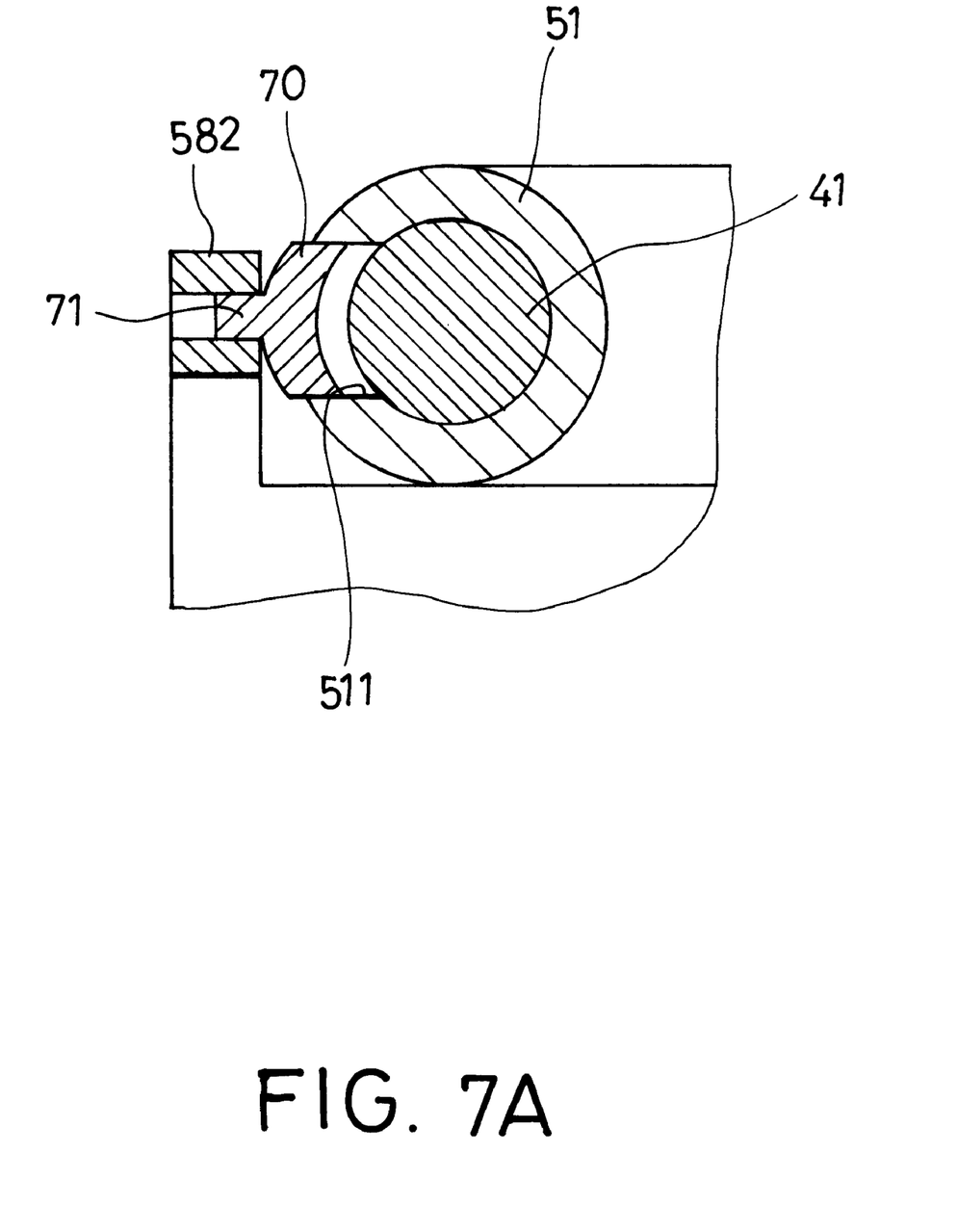
FIG. 7A is an enlarged sectional view of an encircled portion of FIG. 7.

Referring to FIGS. 7 and 7A in combination with FIGS. 2 and 3, when the height of the upper carriage 50 is to be adjusted, one must turn the handle 62 of the wrench 61 to loosen the nut 60 relative to the tube 57, thus moving the tube 57 leftwards as shown by arrow (A) and moving the nut 60 rightwards. As a result, the mounting sleeve 58 moves leftwards and the mounting sleeve 95 is not pushed leftwards by the nut 60, thereby permitting the clamp plates 70 to move outwards or releasing the clamp plates 70 from their clamping positions. In this situation, the upper carriage 50 can be lowered or raised by turning the handle wheel 56 to operate the worms 55 and worm gears 53 so as to adjust the gap between the upper carriage 50 and the base 40 and to control the thickness of the workpiece formed by the planing machine 20. The adjustment can be made via the regulating rod 80 and the slide member 90 as explained hereinafter with reference to FIG. 9.

Figure 8:
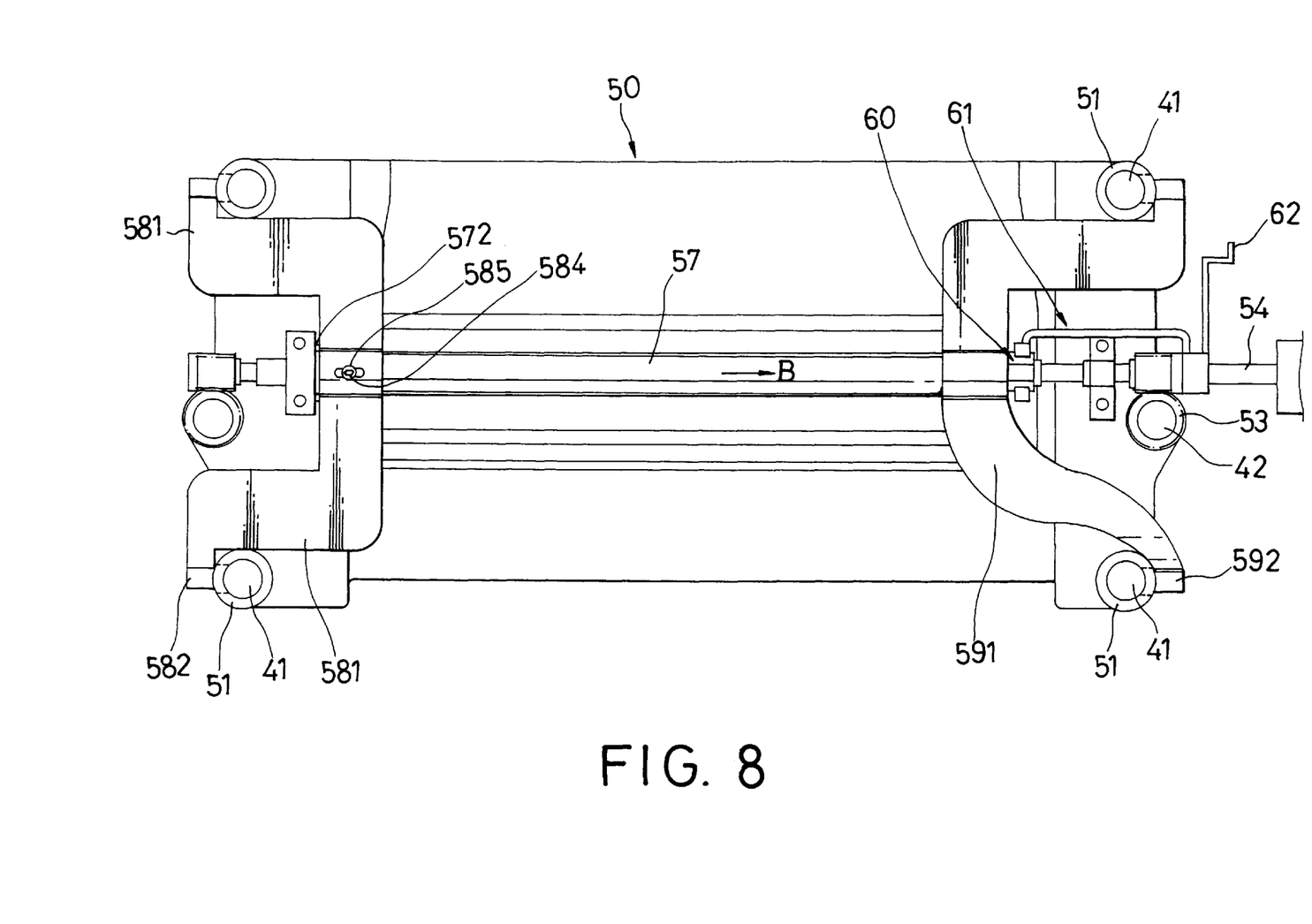
FIG. 8 is a schematic plan view of the locking means with the clamp plates in clamping positions.
Figure 8A:
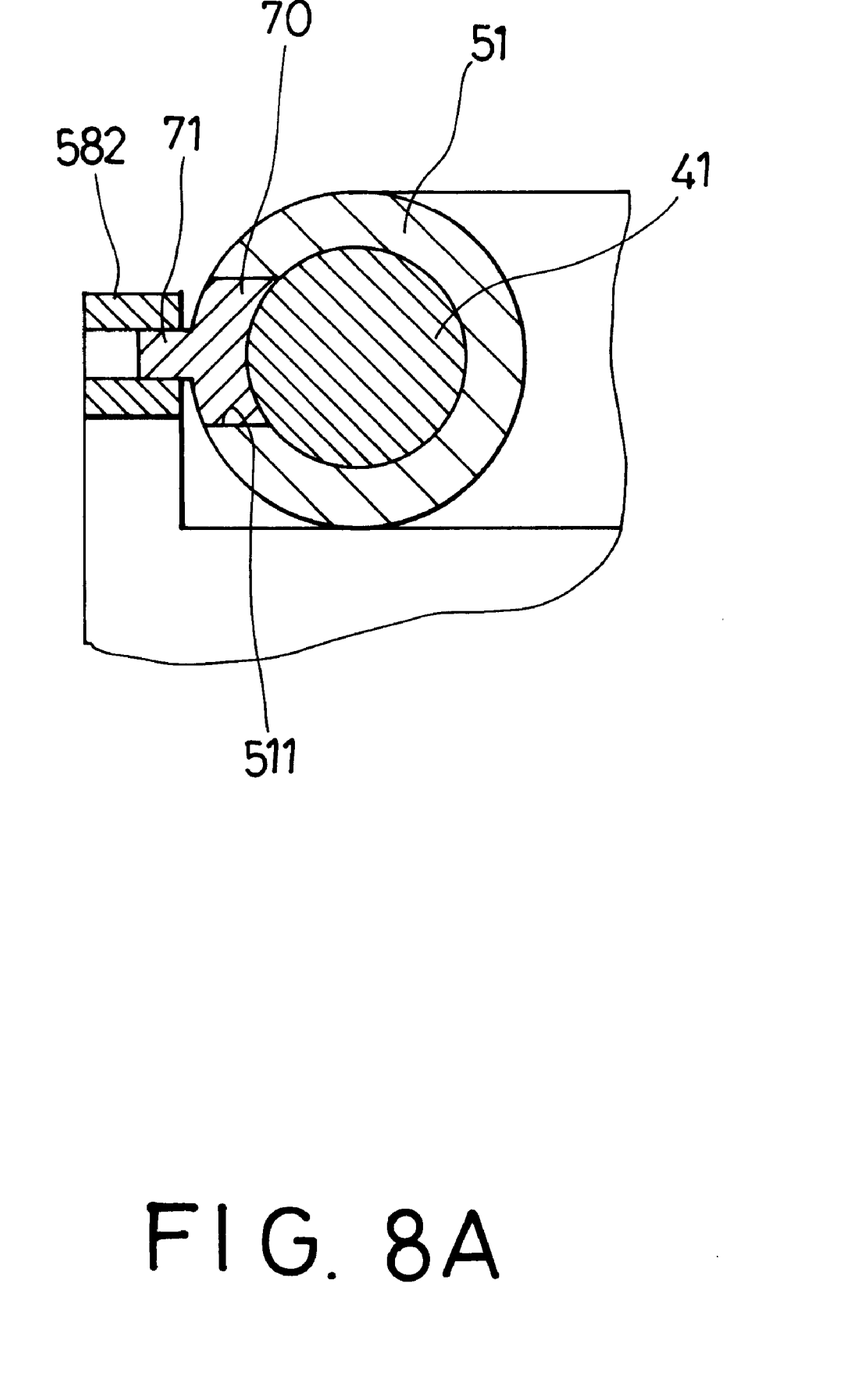
FIG. 8A is a schematic plan view of an encircled portion of FIG. 8.

Referring to FIGS. 8 and 8A, after the upper carriage 50 reaches a desired height, it is locked against movement by tightening the nut 60 via the wrench 61. As the nut 60 is tightened, the tube 57 moves rightwards as shown by arrow (B), and the nut 60 moves leftwards, thus moving the mounting sleeves 58, 59 towards one another and pulling the arms 581, 591 inward. As a result, the clamp plates 70 are moved inward to their clamping position in which each clamp plate 70 abuts tightly against the corresponding post 41.

Figure 9:
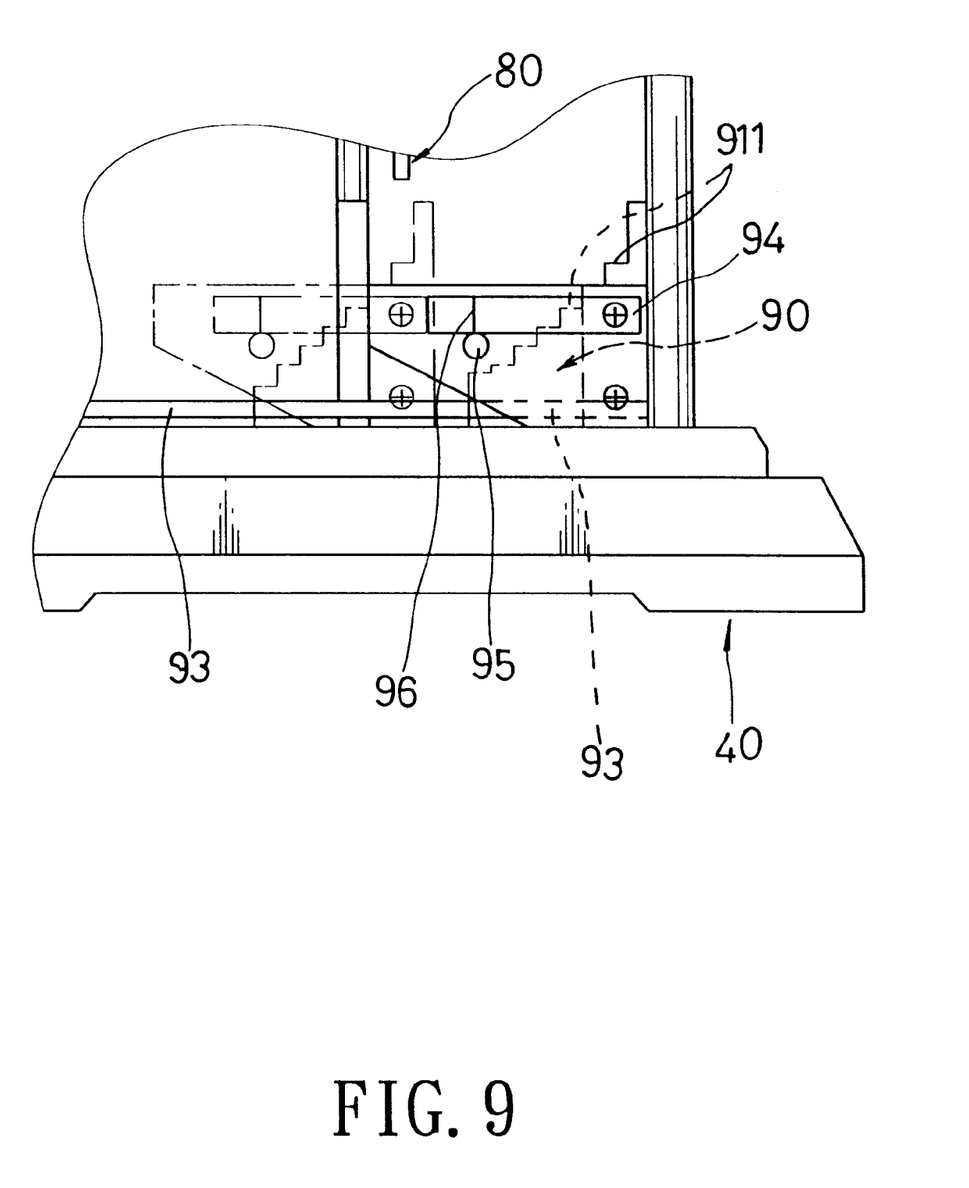
FIG. 9 is a schematic plan view illustrating the operation of the adjusting means.

Referring to FIG. 9 in combination with FIG. 6, when adjusting the gap between the upper carriage 50 and the base 40, one must slide the operating rod 95 forward or backward along the slide slot 442 and position the operating rod 95 in one of the engaging slots 441 corresponding to a graduation mark that indicates a desired workpiece thickness to be accomplished by the planing machine 20. The slide member 90 moves along with the operating rod 95 and reaches a position in which one of the steps 911 is located immediately below the regulating rod 80. When the upper carriage 50 is lowered, the regulating rod 80 contacts the surface of the step 911 lying therebelow, thus stopping the lowering of the upper carriage 50. As such, the upper carriage 50 is placed at a height that will provide a thickness indicated by the corresponding graduation mark 443.

The planing machine 20 provides the following advantages:

1. The locking means of the planing machine 20 dispenses with the use of pivotally interconnected linkage members which may accidentally collapse and release the clamp plates 70. The use of the nut 60 ensures firm positioning of the clamp plates 70, thus preventing accidental unlocking of the upper carriage 50 against movement.

2. The clamping operation is accomplished by pulling inward the arms 581, 591 and pushing the clamp plates 70 inward to their clamping position. As the clamping forces are applied in directions towards the inside of the upper carriage 50, the upper carriage 50 bear the clamping forces with it inner structural parts which have greater thickness and strength than its outer structural parts, thereby reducing the risk of damaging the upper carriage 50 due to the frequently applied clamping forces. The service life of the planing machine 20 can be prolonged.

3. The adjusting means of the planing machine 20 includes a slide member 90 which has a plurality of steps of different heights arranged in a linear row rather than an annular row. Despite an increased number of steps, the slide member 90 can be disposed in a narrow space adjacent to the side cover of the housing of the planing machine 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A planing machine comprising:

a base having two opposing sides, and two pairs of upstanding posts extending upward from said base at said sides, respectively;

an upper carriage having two opposing sides, and two pairs of sockets disposed at said sides of said upper carriage respectively, said upper carriage being mounted movably on said posts, said posts passing through said sockets, said sockets having tubular socket walls surrounding said posts, respectively, each of said tubular socket walls having a window opening;

a pair of screw rods, each of said screw rods extending upward from one of said sides of said base between one of said pairs of said posts, said screw rods passing through said upper carriage;

moving means for moving upward and downward said upper carriage along said posts and for adjusting a gap between said upper carriage and said base, said moving means including a rotating rod mounted on said upper carriage and extending transversely between said screw rods, and a worm drive mechanism connected to said rotating rod, said screw rods and said upper carriage to move said upper carriage when said rotating rod is rotated; and locking means for locking said upper carriage relative to said posts, including a tube which is disposed around said rotating rod and which has two ends adjacent to said screw rods, respectively, two pairs of arms mounted on said two ends of said tube and extending to said sockets, respectively, and two pairs of clamp plates held by said arms, said clamp plates being movably received in said window openings of said tubular socket walls and moved by said arms to a clamping position wherein each of said clamp plates abuts against a corresponding one of said posts.

2. The planing machine as claimed in claim 1, wherein said worm drive mechanism includes two worm gears mounted on said upper carriage around said screw rods and threadedly engaging said screw rods, and two worms mounted on said rotating rod in engagement with said worm gears, respectively.

3. The planing machine as claimed in claim 1, wherein said locking means further includes two mounting sleeves which are sleeved around said two ends of said tube, each of said mounting sleeves holding one of said pairs of said arms.

4. The planing machine as claimed in claim 3, wherein said tube has a screw hole formed in one of said two ends thereof, and a locking screw attached to said tube in said screw hole, one of said mounting sleeves having an axially elongated slot which is aligned with said screw hole and which receives said locking screw so as to prevent rotation of said tube relative to said mounting sleeves.

5. The planing machine as claimed in claim 3, wherein said tube has limiting means provided thereon to prevent rotation of said tube relative to said mounting sleeves, said tube further having an external thread at one of said two ends of said tubes, and a nut disposed around said tube and threadedly engaging said external thread.

6. The planing machine as claimed in claim 5, wherein said locking means further has a wrench mounted on said rotating rod and turnable about said rotating rod to turn said nut relative to said tube, thereby moving said nut and said tube in opposite directions and moving said mounting sleeves.

7. The planing machine as claimed in claim 6, wherein said wrench includes a clamp part to clamp said nut, a mounting part sleeved on said rotating rod, and a handle extending from said mounting part.

8. The planing machine as claimed in claim 1, wherein said posts have outer sides facing outwardly of said two sides of said carriage, said window openings being formed in said tubular socket walls at said outer sides of said posts, respectively, said clamp plates being disposed at said two sides of said carriage outwardly of said posts, said mounting sleeves being movable toward each other to move said clamp plates inward to said clamping position along directions parallel to said rotating rod.

9. The planing machine as claimed in claim 8, wherein each of said clamp plates is formed as a curved plate that complements the corresponding one of said window openings.

10. The planing machine as claimed in claim 8, wherein each of said clamp plates has a curved clamping face and a stem projecting from each of said clamp plates oppositely of said curved clamping face, each of said arms having a hollow seat to fittingly receive said stem.

11. The planing machine as claimed in claim 1, further comprising adjusting means for adjusting the height of said upper carriage relative to said base, said adjusting means having a longitudinal slide member mounted on said base for moving in a direction transverse to said posts, said slide member having a stepped top face with a plurality of steps of different heights arranged in a longitudinal row, said adjusting means further having a regulating member projecting downward from said upper carriage above said stepped top face to contact selectively said steps so as to stop lowering of said upper carriage at one of said heights.

12. The planing machine as claimed in claim 11, wherein said slide member has a bottom provided with a longitudinal slide groove, said base having a horizontal rail adjacent to one of said sides of said base between two adjacent ones of said posts, said rail passing through said slide groove.

13. The planing machine as claimed in claim 12, further comprising a housing to cover said upper carriage and said base, said housing having a side cover at one of said sides of said base, said adjusting means further having a resilient arm member connected integrally with said slide member and disposed in parallel and adjacent said side cover, a restraining spring attached to said resilient arm member and frictionally contacting said side cover to resiliently limit movement of said slide member, and an operating member connected to said resilient arm member and extending outwardly of said side cover.

14. The planing machine as claimed in claim 13, wherein said side cover has a passage therein for outward extension of said operating member, a plurality of engaging slots formed in said passage to be selectively engaged by said operating member, and a slide slot intercommunicated with said engaging slot in said passage to permit said operating member to slide and change the position thereof among said engaging slots.

15. The planing machine as claimed in claim 14, wherein the number of said steps corresponds to that of said engaging slots.

16. The planing machine as claimed in claim 15, wherein said adjusting means further includes graduation marks provided on said side cover at locations corresponding to said engaging slots.

* * * * *